(12) United States Patent
Somani et al.

(10) Patent No.: US 10,181,224 B2
(45) Date of Patent: Jan. 15, 2019

(54) ASSIGNING A TEST SUITE TO TEST EQUIPMENT USING AN EXECUTION GRAPH

(71) Applicant: Accenture Global Solutions Limited, Dublin (IE)

(72) Inventors: Avishek Somani, Toronto (CA); Sunil Raina, Issaquah, WA (US)

(73) Assignee: Accenture Global Solutions Limited, Dublin (IE)

( * ) Notice: Subject to any disclaimer, the term of this patent is extended or adjusted under 35 U.S.C. 154(b) by 275 days.

(21) Appl. No.: 15/072,583

(22) Filed: Mar. 17, 2016

(65) Prior Publication Data

US 2017/0270717 A1 Sep. 21, 2017

(51) Int. Cl.
*G07B 5/08* (2006.01)
*B25J 9/16* (2006.01)
*G06F 17/30* (2006.01)

(52) U.S. Cl.
CPC ............ *G07B 5/08* (2013.01); *B25J 9/1679* (2013.01); *G06F 17/30958* (2013.01); *Y10S 901/01* (2013.01); *Y10S 901/02* (2013.01)

(58) Field of Classification Search
CPC ..... G07B 5/08; G06F 17/30958; G06F 17/00; G06F 17/30; G06F 17/30569; B25J 9/1679; Y10S 901/02; Y10S 901/01
See application file for complete search history.

(56) References Cited

U.S. PATENT DOCUMENTS

| | | | |
|---|---|---|---|
| 6,110,218 A | 8/2000 | Jennings | |
| 6,345,239 B1 * | 2/2002 | Bowman-Amuah | G06Q 20/10 703/6 |
| 6,385,747 B1 | 5/2002 | Scott et al. | |
| 7,543,200 B2 | 6/2009 | Pramanick et al. | |
| 9,032,373 B1 | 5/2015 | Gupta et al. | |
| 2005/0246390 A1* | 11/2005 | House | G06F 17/30312 |
| 2007/0275667 A1 | 11/2007 | Leung et al. | |
| 2013/0117611 A1 | 5/2013 | Chakraborty et al. | |
| 2016/0034723 A1 | 2/2016 | Somani et al. | |

OTHER PUBLICATIONS

Korpela, "Parallel executor for Robot Framework test cases," https://github.com/mkorpela/pabot, Jan. 2, 2014, 3 pages.
Rantanen et al., "Speeding up test execution with Pabot," http://hereberobots.blogspot.in/2015/02/speeding-up-test-execution-with-pabot.html, Feb. 20, 2015, 2 pages.
Collis Test Tools, "Collis AFC Automated Test Environment," https://www.collistesttools.com/catalog/by-solution/transit-test-tools/collis-afc-automated-test-environment/c-24/c-1106/p-304, Nov. 4, 2015, 2 pages.

* cited by examiner

*Primary Examiner* — Nikolay Yushin
(74) *Attorney, Agent, or Firm* — Harrity & Harrity, LLP (57) ABSTRACT

A device may receive a test scenario that includes actions to be performed by test equipment. The test scenario may be associated with a test suite. The device may receive availability information indicating a quantity, a type, or a status of the test equipment or a resource of the test equipment for performing the actions. The device may determine an order in which the actions are to be performed. The device may generate scheduling information for the actions based on the order and the availability information. The device may schedule the actions for execution by the test equipment. The device may transmit information that causes the actions to be performed by the test equipment based on the scheduling information.

20 Claims, 8 Drawing Sheets

ASSIGNING A TEST SUITE TO TEST EQUIPMENT USING AN EXECUTION GRAPH

BACKGROUND

Scenario testing may include the use of scenarios to test an outcome. A scenario may describe interactions of user roles and a technical system, which may include computer hardware and software. The scenario may include one or more steps. In some cases, the scenario may describe a manner in which the technical system is to be used. For example, the scenario may describe a transaction, an operation, or the like, associated with the technical system.

SUMMARY

According to some possible implementations, a device may include one or more processors to receive information that identifies a plurality of test steps to be performed by a plurality of test equipment. The one or more processors may determine one or more dependencies associated with the plurality of test steps. The one or more processors may receive availability information associated with an availability of the plurality of test equipment for performing the plurality of test steps. The availability information may include an indication of a type of at least one test equipment of the plurality of test equipment. The one or more processors may generate an execution graph based on the availability information and the one or more dependencies. The execution graph may indicate an order of execution, by the plurality of test equipment, of the plurality of test steps. The one or more processors may assign one or more test steps, of the plurality of test steps, to one or more test equipment, of the plurality of test equipment, based on the execution graph. The one or more processors may provide one or more instructions, to the one or more test equipment, to cause the one or more test equipment to perform the one or more test steps based on assigning the one or more test steps to the one or more test equipment.

According to some possible implementations, a non-transitory computer-readable medium may store one or more instructions that, when executed by one or more processors, cause the one or more processors to receive a test suite associated with a test. The test suite may include a plurality of test steps associated with one or more test scenarios. The one or more instructions may cause the one or more processors to receive availability information indicating an availability of test equipment to be used during the test. The availability information may further indicate a type of the test equipment. The one or more instructions may cause the one or more processors to determine at least one dependency associated with the plurality of test steps. The one or more instructions may cause the one or more processors to generate, based on the availability information and the at least one dependency, scheduling information associated with scheduling the test suite for execution by the test equipment. The one or more instructions may cause the one or more processors to schedule the test suite for execution, based on the scheduling information. The one or more instructions may cause the one or more processors to provide instructions to the test equipment that indicate a manner of executing the test suite.

According to some possible implementations, a method may include receiving, by a device, at least one test scenario including actions to be performed by test equipment. The at least one test scenario may be associated with a test suite. The method may include receiving, by the device, availability information indicating a quantity, a type, or a status of the test equipment or a resource of the test equipment for performing the actions. The method may include determining, by the device, an order in which the actions are to be performed. The method may include generating, by the device, scheduling information for the actions based on the order and the availability information. The method may include scheduling, by the device, the actions for execution by the test equipment. The method may include transmitting, by the device, information that causes the actions to be performed by the test equipment based on the scheduling information.

DETAILED DESCRIPTION

The following detailed description of example implementations refers to the accompanying drawings. The same reference numbers in different drawings may identify the same or similar elements.

An automated fare management system may include one or more devices, such as devices to read and/or write media (e.g., ticket office terminals, fare gates, etc.), back office devices (e.g., fare management devices, media management devices, etc.), or the like. Prior to deployment of the automated fare management system, the automated fare management system may undergo testing. In some cases, the testing may include automatic testing where a test management device schedules (e.g., assigns, allocates, etc.) test equipment, such as test robots, card reader devices, or the like, to execute test steps, which may include actions and associated information. In some cases, the test equipment may include resources, such as a card reader, a stepper motor, a web browser, a turnstile controller, a robotic arm, a global positioning system (GPS), or the like.

When scheduling the test steps for execution, the test management device may increase an efficiency of the test management device and/or the test equipment by using availability information (e.g., a quantity, a type, a status, etc.) associated with an availability of the test equipment and/or tester parameter information, such as information associated with reducing an amount of time for executing the test steps, information associated with reducing an amount of power that the test equipment consumes during the execution of the test steps, reducing a quantity of test equipment that execute the test steps, or the like. Additionally, the test management device may dynamically adjust the execution of the test steps using the availability information and/or the tester parameter information. This may increase an efficiency of the test equipment by reducing execution time, reducing power consumption, and/or enabling the test management device to adjust the execution of the test steps during the execution of the test steps.

Figure 1A:
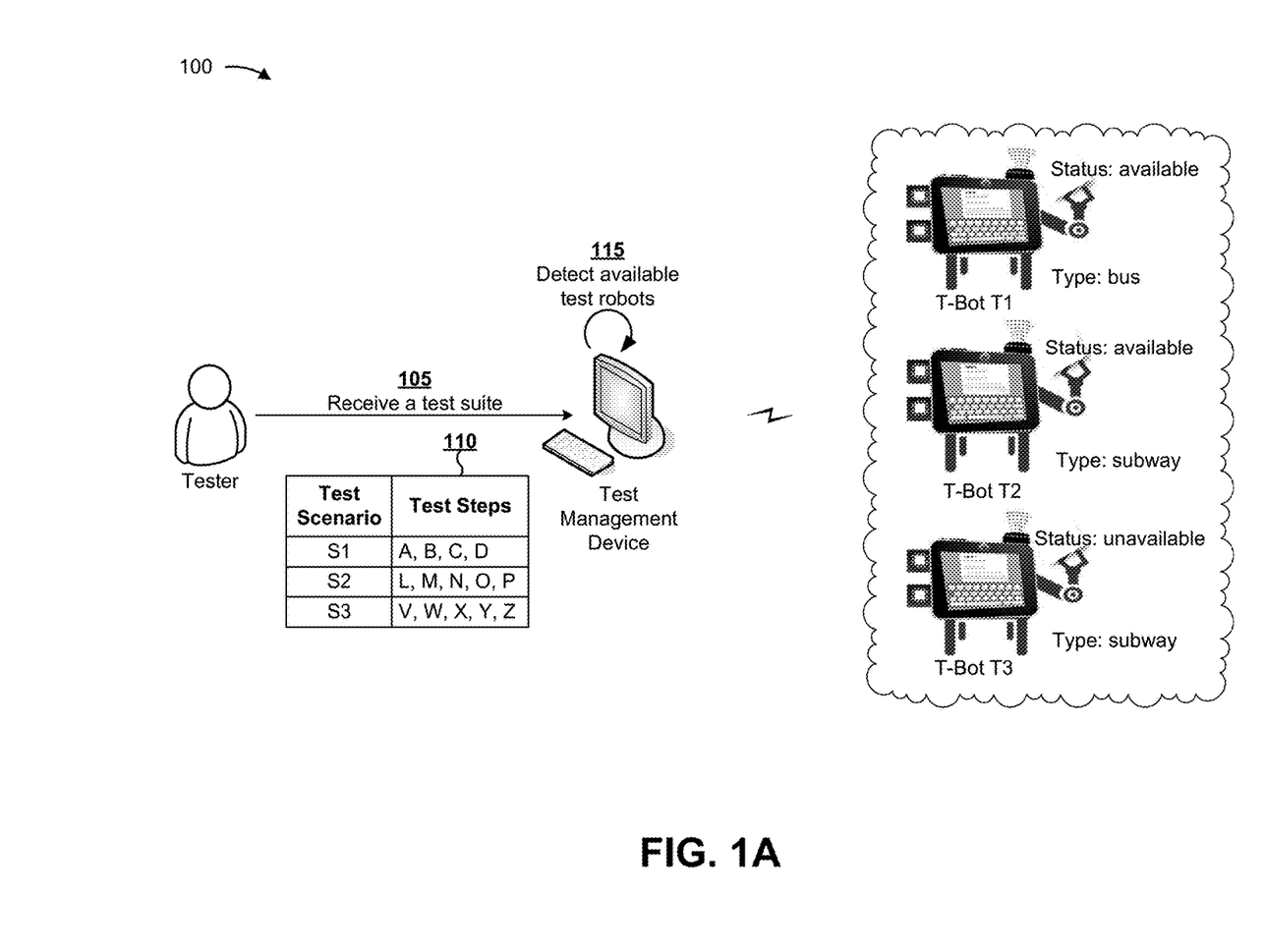
FIGS. 1A-1E are diagrams of an overview of an example implementation described herein.

FIGS. 1A-1E are diagrams of an overview of an example implementation 100 described herein. As shown in FIG. 1A, and by reference number 105, a test management device (e.g., a computer device) may receive a test suite via tester input. As shown by reference number 110, the test suite may include one or more test scenarios (e.g., shown as "S1," "S2," and "S3"). The test suite may also include one or more test steps (e.g., shown as "A," "B," "C," etc.) associated with the test scenarios, where the test steps define the steps to be executed to perform the test scenarios.

As shown by reference number 115, the test management device may detect available test equipment (e.g., shown as test robots "T-Bot T1," "T-Bot T2," and "T-Bot T3") for performing the test scenarios included in the test suite. For example, the test management device may detect information associated with the test robots that indicates that test robot T1 and test robot T2 are available (e.g., shown as "status: available") and that test robot T3 is unavailable (e.g., shown as "status: unavailable"). In some implementations, the test management device may detect the type of the test robots (e.g., a bus test robot, a subway test robot, etc.). For example, the test management device may detect that test robot T1 is a bus test robot and that test robots T2 and T3 are subway test robots.

Figure 1B:
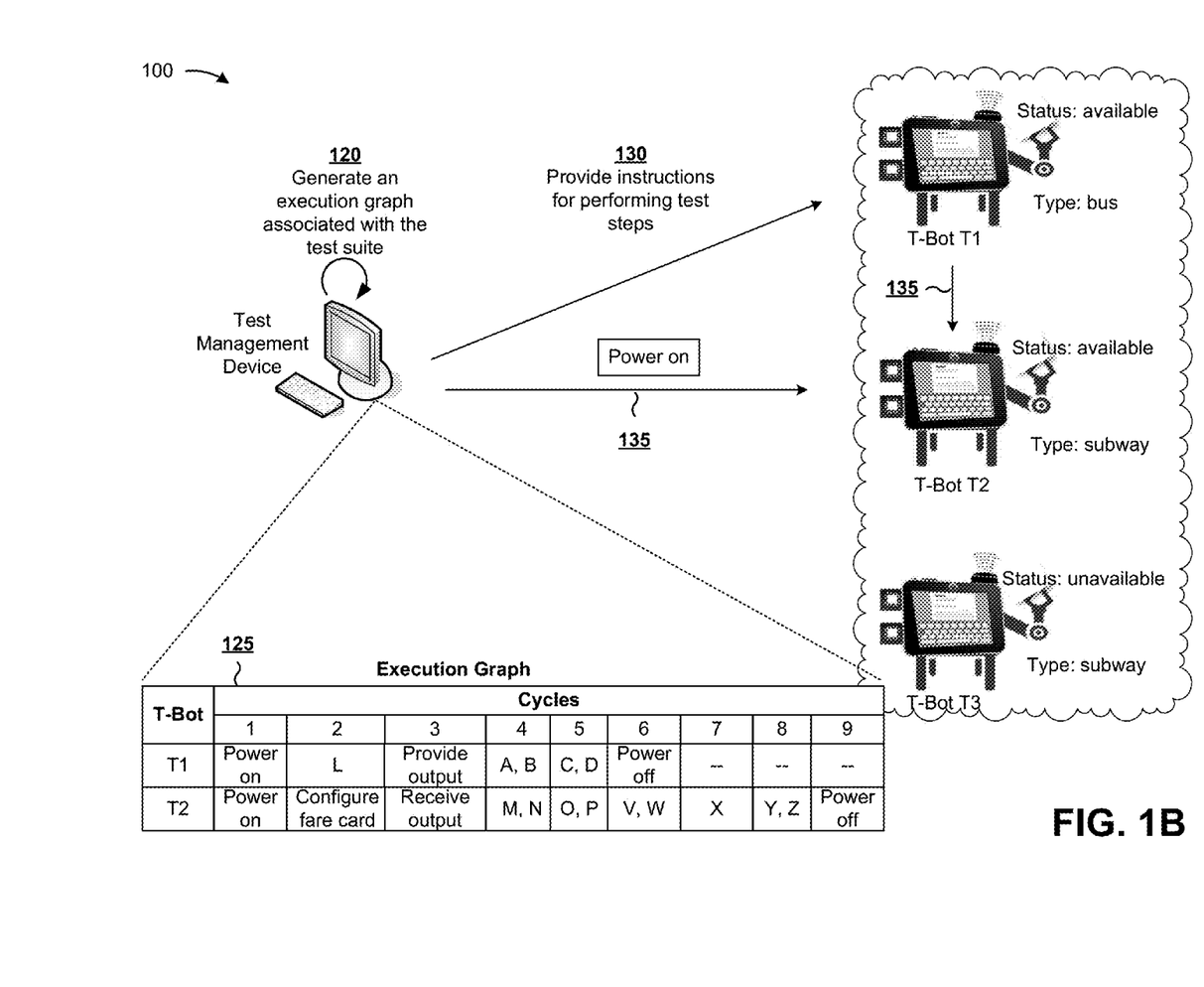

As shown in FIG. 1B, and by reference number 120, the test management device may generate an execution graph associated with the test suite. As shown by reference number 125, the execution graph may indicate a set of available test robots (e.g., shown as "T1" and "T2") and corresponding test steps to be performed by the test robots during particular time periods. In some implementations, test steps for multiple test scenarios may be scheduled for execution by a single test robot.

Additionally, or alternatively, the test steps may be scheduled for execution by a particular type of test robot. For example, assume that the test steps associated with test scenario S1 are to be executed by a bus test robot. In this case, the test management device may schedule the test steps associated with test scenario S1 to test robot T1, based on test robot T1 being a bus test robot.

As another example, assume that the test steps associated with test scenario S3 are to be performed by a subway test robot. In this case, the test management device may schedule the test steps associated with test scenario S3 to test robot T2, based on test robot T2 being a subway test robot.

Additionally, or alternatively, different test steps of a single test scenario may be performed by multiple test robots. For example, for test scenario S2, assume that test step L is to be performed by a bus test robot and that test steps M through P are to be performed by a subway test robot. In this case, the test management device may schedule test step L for execution by test robot T1 and test steps M through P for execution by test robot T2.

As shown, the execution graph may include a quantity of cycles (e.g., shown as 1 through 9), such as time periods, steps, or the like. When generating the execution graph, the test management device may schedule power on test steps (e.g., shown as "Power on") and configuration test steps (e.g., shown as "Configure fare card") to power on and/or configure the test robots prior to executing one or more test steps of the test scenarios. Additionally, or alternatively, the test management device may schedule test steps for the test robots to provide and/or receive output (e.g., shown as "Provide output" and "Receive output") to and/or from one or more other test robots. For example, the test management device may schedule test robot T1 to provide output and test robot T2 to receive output during cycle 3, as described more fully below. The test management device may schedule power off test steps (e.g., shown as "Power off") to power off the test robots when idle or when the test robots have completed executing the test steps.

The test management device may schedule the test steps for execution on the test robots. For example, the test management device may schedule the test steps based on dependencies between the test steps, based on an availability of the test robots, and/or based on tester parameter information indicating a reduction of a total amount of time for execution of the test steps, a reduction of a total amount of power that the test robots are to consume when performing the test steps, a reduction of a total quantity of test robots executing the test steps, or the like.

In some cases, the test management device may determine that a single test robot may execute multiple test steps synchronously during a single cycle (e.g., shown as "A, B"; "C, D"; "M, N"; etc.). The test management device may schedule the test steps for synchronous execution based on the availability of resources of the test equipment, the dependency of the test steps, and/or the tester parameter information. Additionally, or alternatively, the test management device may determine that multiple test robots may execute test steps synchronously. For example, the test management device may determine that both test robot T1 and test robot T2 may execute test steps during cycle 4, which may reduce a total amount of time for executing the test steps.

In some cases, the execution graph may indicate that test robot T1 is to perform test step L, associated with test scenario S2, prior to test robot T2 performing test steps M and N, also associated with test scenario S2, such as when test steps M and N are to use an output of test step L. The test management device may schedule test robot T1 to execute test step L prior to executing the test steps associated with test scenario S1 to enable test robot T2 to receive the output from test step L and to begin executing test steps M and N, rather than scheduling test robot T2 to wait for test robot T1 to execute test steps A through D first, thereby reducing the total amount of time for executing the test steps.

As shown by reference number 130, the test management device may provide instructions for performing the test steps to test robot T1, based on the execution graph. For example, the test management device may provide instructions to test robot T1 to power on during cycle 1 and to perform test step L during cycle 2, and so on. As shown by reference numbers 135, the test management device and/or test robot T1 may provide instructions and/or output to test robot T2. For example, the test management device may provide instructions to test robot T2 to power on during cycle 1 and to configure a fare card during cycle 2. Additionally, or alternatively, test robot T1 may provide output from test step L to test robot T2 during cycle 3 prior to test robot T2 performing test steps M and N during cycle 4.

Figure 1C:
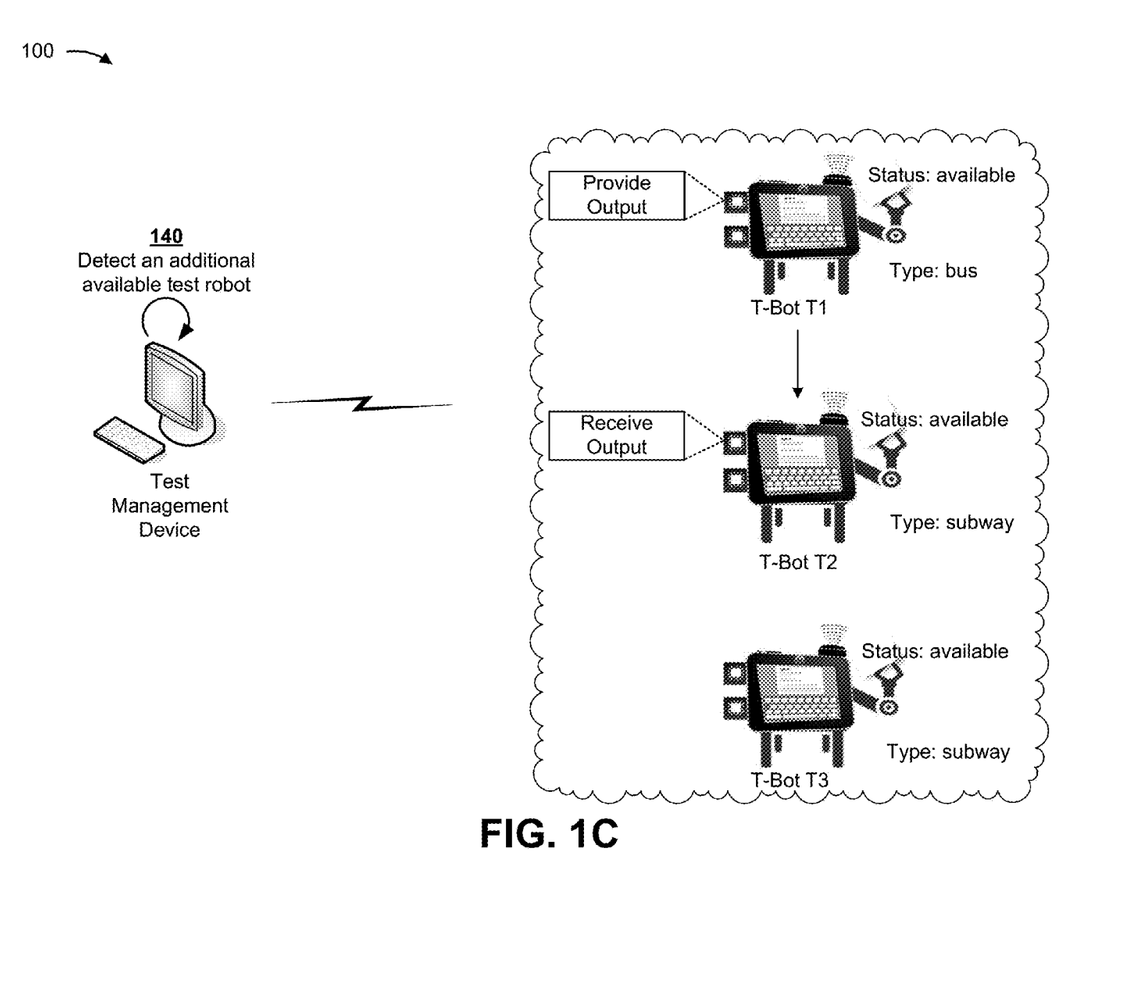

As shown in FIG. 1C, and by reference number 140, the test management device may detect an additional available test robot during the execution of the test steps. For example, the test management device may detect information that indicates that test robot T3 is available (e.g., as shown by "status: available") during cycle 3. The test management device may detect that test robot T3 is a subway test robot.

Figure 1D:
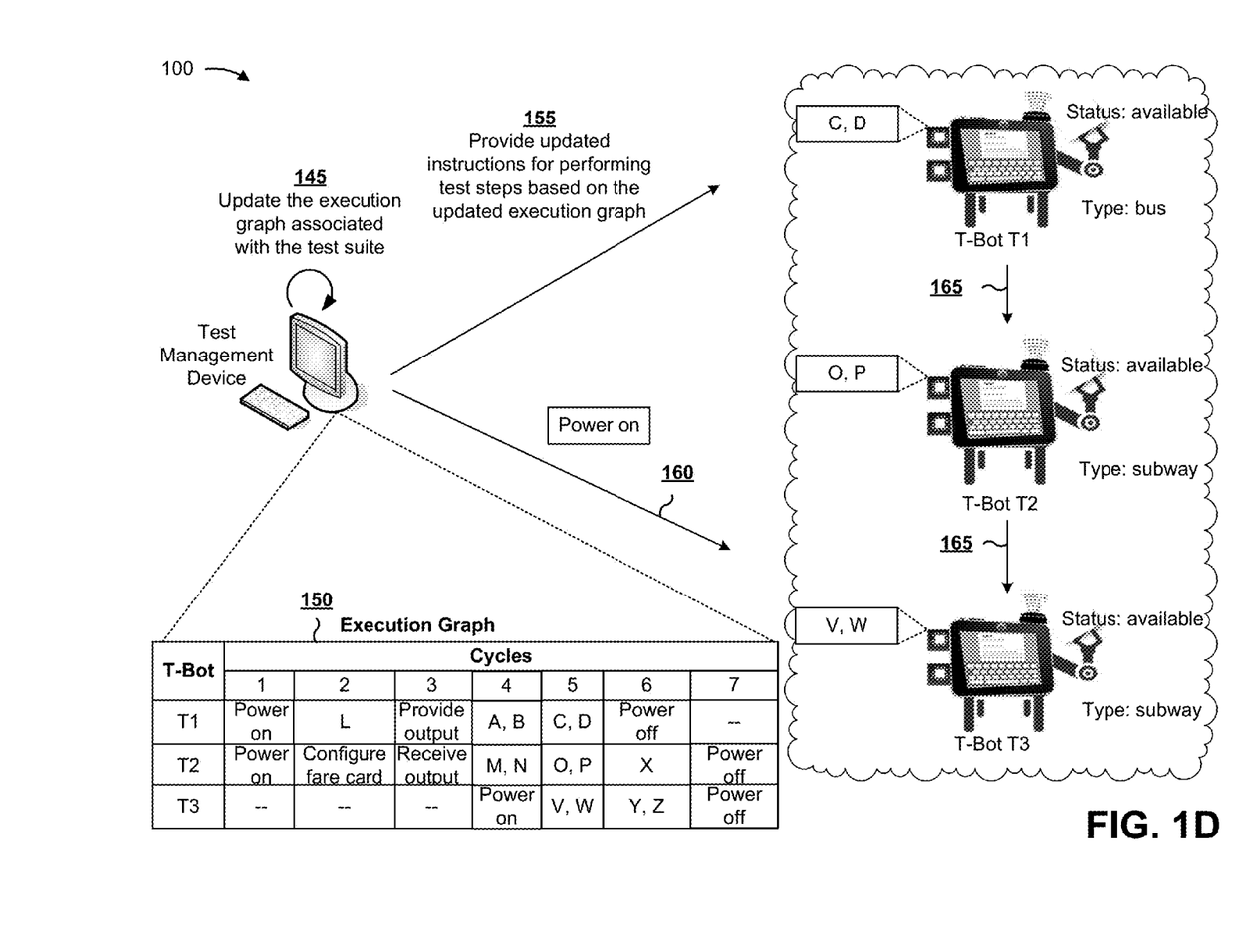

As shown in FIG. 1D, and by reference number 145, the test management device may update the execution graph associated with the test suite. As shown by reference number 150, the test management device has scheduled test robot T3 to execute test steps previously assigned to test robot T2 (e.g., shown as "V, W" and "Y, Z").

When updating the execution graph, the test management device may schedule test robot T2 to finish executing test steps M through P associated with test scenario S2 prior to executing test steps associated with a different test scenario, such as test step X associated with test scenario S3, which may reduce an amount of time that the test management device is waiting for output from the execution of test scenario S2.

When updating the execution graph, the test management device may schedule test steps for synchronous execution where the test steps were previously scheduled for asynchronous execution. For example, the test management device has scheduled test robot T2 to execute test step X and test robot T3 to execute test steps Y and Z during cycle 6, where the test management device previously scheduled test robot T2 to execute test step X during cycle 7 and test steps Y and Z during cycle 8. The test management device may schedule test steps X, Y, and Z for execution during the same cycle based on the availability of the test robots, the dependency between the test steps, and/or the tester parameter information. As further shown by reference number 150, the cycles for executing the test scenarios decreased from nine cycles to seven cycles based on updating the execution graph.

As shown by reference number 155, the test management device may provide updated instructions for performing the test steps to test robot T1. When providing the updated instructions, the test management device may not provide instructions for previously executed test steps and/or instructions for test steps currently being executed. As shown by reference number 160, the test management device may provide instructions to test robot T3 to power on during cycle 4 based on the updated execution graph. As shown by reference number 165, test robot T1 may provide the updated instructions and/or test step output to test robot T2, which may provide the updated instructions and/or test step output to test robot T3.

Figure 1E:
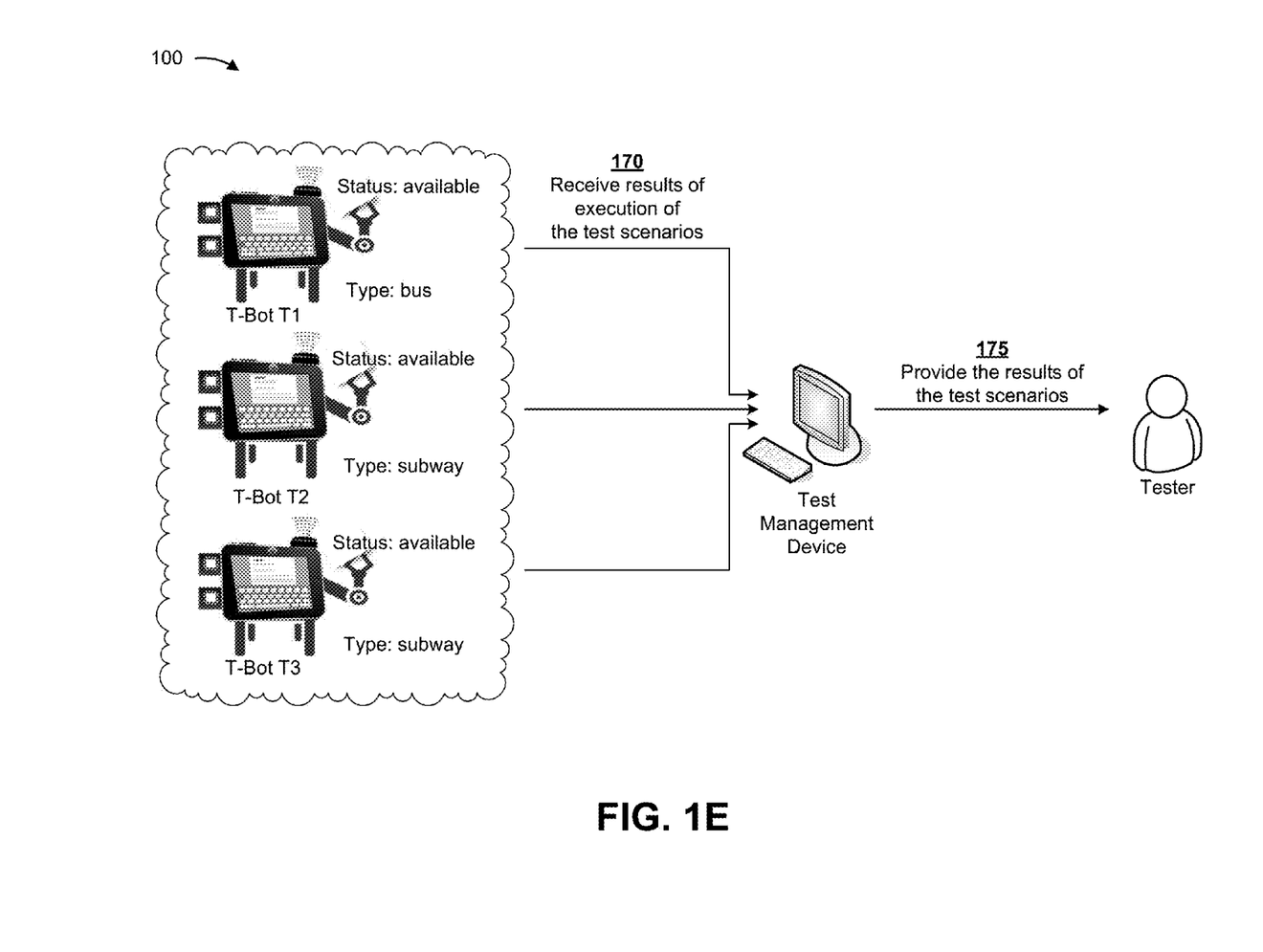

As shown in FIG. 1E, and by reference number 170, the test management device may receive results of execution of the test scenarios. The test management device may receive the test results from the test robots. As shown by reference number 175, the test management device may provide the results of the test scenarios to the tester, such as by providing the results for display.

In this way, a test management device may dynamically assign test scenarios to test equipment, which may increase an efficiency of an execution of the test scenarios by reducing an execution time for the test scenarios. Additionally, the test management device may conserve computing, processor, and/or power resources by reassigning the test scenarios for execution on the test equipment, scheduling the test equipment to power off when idle, and/or managing a quantity of test equipment executing the test scenarios.

As indicated above, FIGS. 1A-1E are provided merely as an example. Other examples are possible and may differ from what was described with regard to FIGS. 1A-1E. For example, the systems and/or processes described herein may be applied to test other systems besides a fare management system, such as an e-commerce system, a vehicle (e.g., a car, a truck, an airplane, a hoverboard, etc.), a computing system, a manufacturing system, a production system, a sales system, a networked system (e.g., a network, an optical network, etc.), a telecommunications system, a parallel processing system, a system that includes multiple pieces of equipment, a system that includes multiple pieces of equipment capable of performing tasks in parallel and/or in series, or another type of system. While implementations described herein relate to testing a fare management system, the systems and/or processes described herein may be used to test any of these other types of systems.

Figure 2:
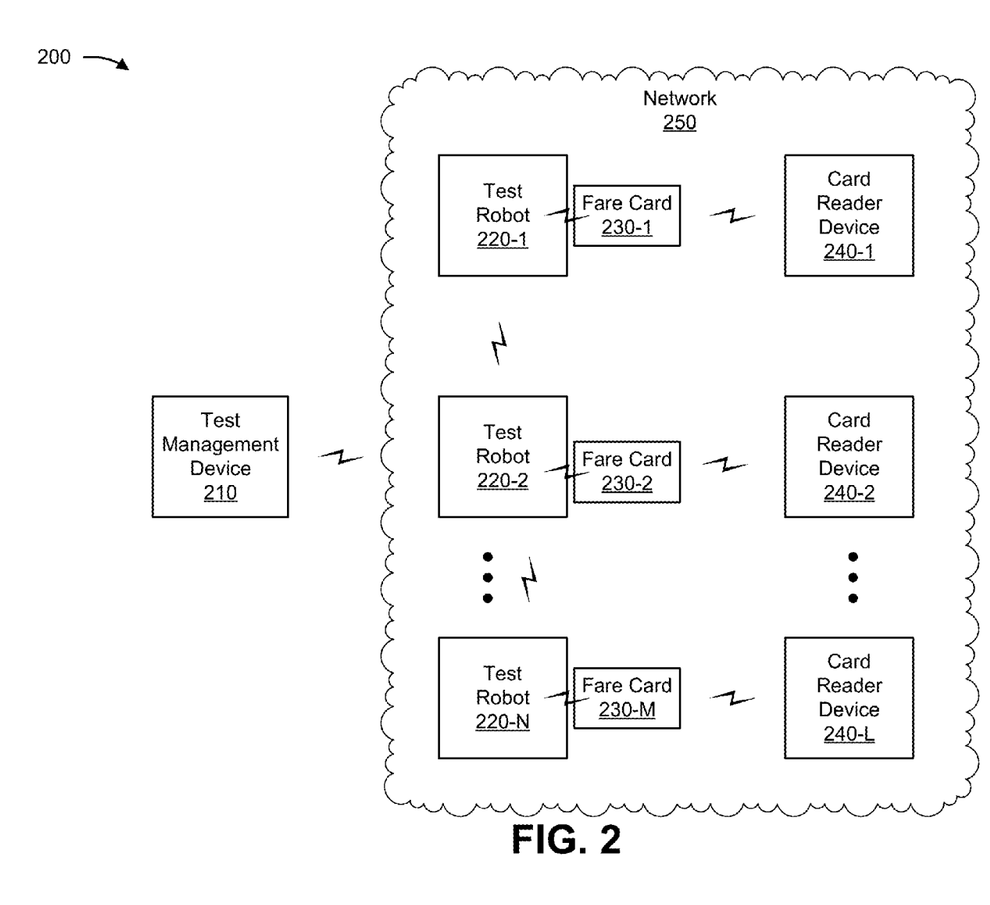
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a test management device 210, a set of test robots 220-1 through 220-N(N≥1) (hereinafter referred to collectively as "test robots 220," and individually as "test robot 220"), a set of fare cards 230-1 through 230-M (M≥1) (hereinafter referred to collectively as "fare cards 230," and individually as "fare card 230"), a set of card reader devices 240-1 through 240-L (L≥1) (hereinafter referred to collectively as "card reader devices 240," and individually as "card reader device 240"), and a network 250. Devices of environment 200 may interconnect via wired connections, wireless connections, or a combination of wired and wireless connections.

Test management device 210 may include one or more devices capable of receiving, generating, storing, processing, analyzing, and/or providing information associated with testing an automated fare management system. For example, test management device 210 may include a computing device, such as a server device, a workstation computer, a desktop computer, a laptop computer, a tablet computer, a mobile phone, a cluster of servers, a portable embedded computer device, a custom processor board, or the like. Test management device 210 may provide a test scenario to a set of test robots 220 and/or a set of card reader devices 240, may manage execution of the test scenario by the set of test robots 220 and/or card reader devices 240, may receive a test result of the execution, and/or may analyze the test result.

Test robot 220 (sometimes referred to herein as a "test robot" or a "T-Bot") may include one or more devices capable of receiving, generating, storing, processing, analyzing, and/or providing information associated with testing an automated fare management system. In some implementations, test robot 220 may include a robot. In some implementations, test robot 220 may include, for example, a processor for processing instructions (e.g., for executing a test scenario), a fare card reader to read card information from fare card 230, a fare card writer to write information to fare card 230, one or more actuators to move fare card 230 into a communicative proximity of card reader device 240 (e.g., an actuator arm, a robotic arm, a piston, a motor, etc.), one or more sensors to detect feedback from card reader device 240 (e.g., a light sensor, an audio sensor, a haptic sensor, an image processing component, a microphone, etc.), a display component to display information (e.g., card information), a communication interface (e.g., Wi-Fi, Bluetooth, Ethernet, etc.) to communicate with other devices (e.g., test management device 210, card reader device 240, a back office server device, etc.), or the like. Test robot 220 may receive a test scenario from test management device 210 and/or from another test robot 220, may execute the test scenario (e.g., by interacting with fare card 230 and/or card reader device 240), and may provide a result of executing the test scenario (e.g., card information or other information) to test management device 210 and/or another test robot 220.

Fare card 230 may include one or more devices capable of receiving, storing, and/or providing card information associated with an automated fare management system. For example, fare card 230 may include a smart card (e.g., a contact smart card, a contactless smart card, a reloadable smart card, a reprogrammable smart card, etc.), a chip card, an integrated circuit card, an identification card, a proximity card, an access card, a contactless card, a radio-frequency identification (RFID) card, a magnetic stripe fare card, a limited use media, a mobile device (e.g., executing a fare card application, such as a mobile wallet), a sensor, a near-field communication device, a Bluetooth tag, a Bluetooth low energy tag, a Bluetooth 4.0 device, a sensor sticker, a wearable device, a wireless key fob, or the like. Fare card 230 may store card information, such as a card balance stored by fare card 230 or a credential stored by fare card 230 (e.g., a credential used to access a card balance via a back office server device). Test robot 220 and/or card reader device 240 may interact with fare card 230 to read and/or write the card information stored by fare card 230.

Card reader device 240 may include one or more devices capable of reading card information from fare card 230 and/or writing card information to fare card 230. For example, card reader device 240 may include a contactless smart card reader, a fare card terminal, a fare card vending machine, a fare box, a ticket machine, a station device (e.g., that interacts with a turnstile), a turnstile, a card reader, a card writer, a card query device (e.g., used to check a card balance), a kiosk (e.g., a self-service kiosk), an inspection device (e.g., used to check whether a passenger paid a fare), a point-of-sale device, a fare transaction processor, a mobile device (e.g., a phone, a tablet, etc.), a handheld inspection device, or the like. Card reader device 240 may be configured to read card information from fare card 230 in communicative proximity (e.g., within a particular range, such as thirty centimeters, five meters, etc.) of card reader device 240, to process the card information to determine updated card information to be provided to fare card 230, and to provide the updated card information to fare card 230 for storage.

Network 250 may include one or more wired and/or wireless networks. For example, network 250 may include a cellular network, a public land mobile network (PLMN), a local area network (LAN), a wide area network (WAN), a metropolitan area network (MAN), a telephone network (e.g., the Public Switched Telephone Network (PSTN)), a personal area network (e.g., a Bluetooth network, a Bluetooth low energy network, etc.), a private network, an ad hoc network, an intranet, the Internet, a fiber optic-based network, a cloud computing network, a Bluetooth network, and/or a combination of these or another type of network.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
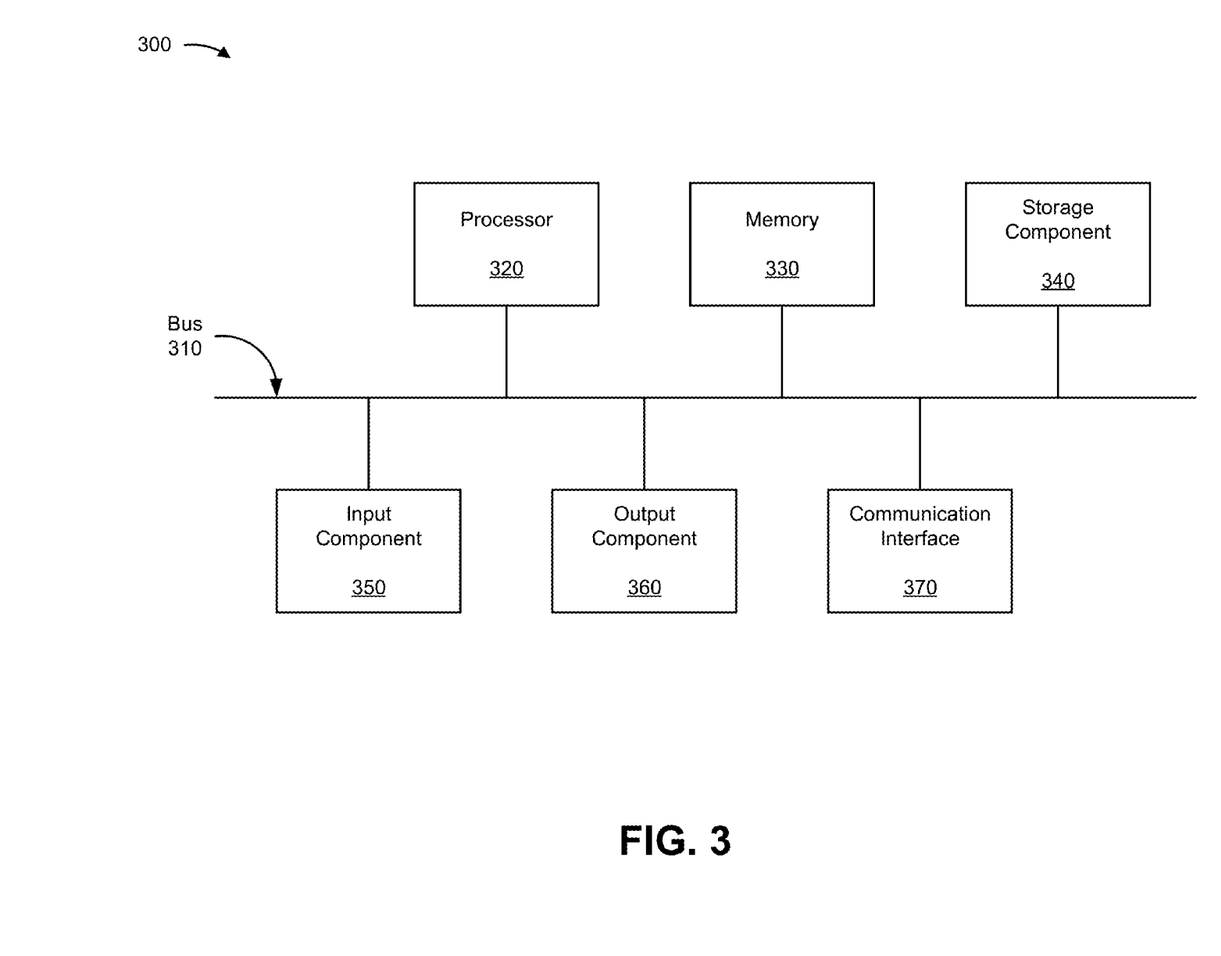
FIG. 3 is a diagram of example components of one or more devices of FIG. 2.

FIG. 3 is a diagram of example components of a device 300. Device 300 may correspond to test management device 210, test robot 220, fare card 230, and/or card reader device 240. In some implementations, test management device 210, test robot 220, fare card 230, and/or card reader device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a GPS component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A non-transitory computer-readable medium is defined herein as a non-transitory memory device. A memory device includes memory space within a single physical storage device or memory space spread across multiple physical storage devices.

Software instructions may be read into memory 330 and/or storage component 340 from another non-transitory computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
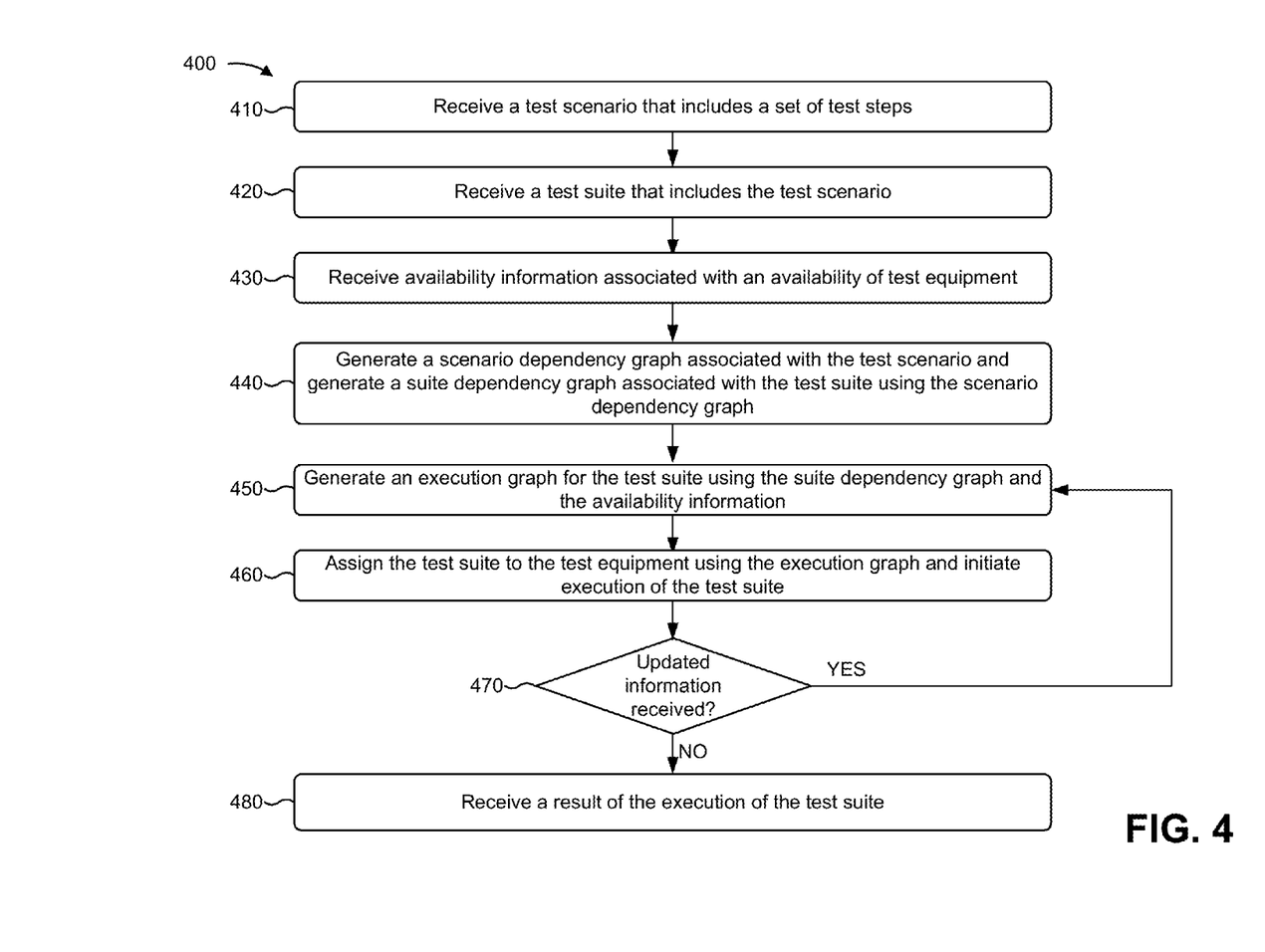
FIG. 4 is a flow chart of an example process for assigning a test suite to test equipment using an execution graph.

FIG. 4 is a flow chart of an example process 400 for assigning a test suite to test equipment using an execution graph. In some implementations, one or more process blocks of FIG. 4 may be performed by test management device 210. In some implementations, one or more process blocks of FIG. 4 may be performed by another device or a group of devices separate from or including test management device 210, such as test robot 220, fare card 230, and/or card reader device 240.

As shown in FIG. 4, process 400 may include receiving a test scenario that includes a set of test steps (block 410). For example, test management device 210 may receive a test scenario via tester interaction with test management device 210, or another device, such as via tester interaction with a user interface. In some implementations, the test scenario may include the set of test steps, where a test step indicates an action to be performed by test equipment (e.g., test robot 220, card reader device 240, etc.). For example, an action may include validating data, moving a robotic arm associated with test robot 220, validating transaction information and/or data, tapping fare card 230 to card reader device 240 (e.g., moving fare card 230 within communicative proximity of card reader device 240), or the like.

In some implementations, the test step may include information associated with the test step. For example, the test step may indicate input data to be processed during the execution of the test step. Additionally, or alternatively, the test step may indicate resources associated with implementing the action. Additionally, or alternatively, the test step may indicate output data to be returned. Additionally, or alternatively, the test step may indicate an execution time of the test step. Additionally, or alternatively, the test step may indicate an order of the test step relative to another test step. Additionally, or alternatively, the test step may indicate success and/or failure criteria associated with the test step.

In some implementations, the test step may be associated with a dependency, such as when a second test step depends from a first test step. For example, the second test step may depend from the first test step when the second test step uses and/or receives output (e.g., data, configurations, etc.) from the first test step. Additionally, or alternatively, the second test step may depend from the first test step when a single test equipment is to execute both the first test step and the second test step (e.g., the test steps cannot be performed by different test equipment). Additionally, or alternatively, the second test step may depend from the first test step when the first test step and the second test step use a same resource of the test equipment. Additionally, or alternatively, the second test step may depend from the first test step when the tester has indicated (e.g., via a rule, restriction, etc.) that the second test step depends from the first test step.

In some implementations, a test step may be associated with multiple test scenarios. For example, a first test step may be associated with a first test scenario and a second test scenario. In this case, the test equipment may schedule a single execution of the first test step, rather than scheduling the first test step for execution twice, which may reduce the amount of time for executing the test steps and/or conserve computing, power, and/or processor resources by preventing repetitive execution of the first step.

In some implementations, test management device 210 may receive a test scenario that includes test steps that the tester input to test management device 210 and/or selected from a set of test steps stored on test management device 210 and/or another device. For example, test management device 210 may receive a test scenario where the tester configured the test scenario by inputting a first test step and selecting a second test step.

In some implementations, test management device 210 may receive a test scenario that includes information that identifies a sequence of test steps. For example, the information may indicate that a first test step is to be executed prior to executing a second test step, that the second test step is to be executed prior to executing a third test step, etc.

As further shown in FIG. 4, process 400 may include receiving a test suite that includes the test scenario (block 420). For example, test management device 210 may receive the test suite via tester interaction with test management device 210, or another device, such as via tester interaction with a user interface. Assume, for example, that test management device 210 receives a test suite that includes the test scenario.

In some implementations, the test suite may include multiple test scenarios. For example, the test suite may include a first test scenario, a second test scenario, a third test scenario, etc. In some implementations, test management device 210 may receive a test suite that the tester has input to test management device 210 and/or selected from a set of test suites stored on test management device 210.

In some implementations, test management device 210 may receive a test suite that includes information that identifies a sequence of test scenarios when the test suite includes multiple test scenarios. For example, the information may indicate that the test steps associated with a first test scenario are to be executed prior to executing the test steps associated with a second test scenario, etc.

As further shown in FIG. 4, process 400 may include receiving availability information associated with an availability of test equipment (block 430). For example, test management device 210 may receive availability information that indicates whether the test equipment is available for executing the test steps. In some implementations, the availability information may indicate whether resources of the test equipment are available for executing the test steps.

In some implementations, the availability information may indicate a quantity of the test equipment. For example, the availability information may indicate a quantity of available and/or unavailable test robots 220, card reader devices 240, or the like. Additionally, or alternatively, the availability information may indicate a type (e.g., bus, subway, etc.) of the test equipment. For example, the availability information may indicate that a bus test robot is available or unavailable. In some implementations, rules may govern whether a type of test equipment may perform a particular test step. For example, the rules may permit a bus test robot to tap fare card 230 to a bus card reader and prevent a bus test robot from tapping fare card 230 to a subway card reader.

Additionally, or alternatively, the availability information may indicate a status of the test equipment (e.g., available, unavailable, etc.). In some implementations, the availability information may indicate that a first test robot 220 is available to execute the test steps. For example, the availability information may indicate that the test equipment is available when the test equipment is idle or not scheduled to execute a test step. As another example, the availability information may indicate that the test equipment is available when a test step being scheduled may be performed synchronously with one or more test steps previously scheduled for the test equipment. As another example, the availability information may indicate that the test equipment is available when the test equipment is powered on. As another example, the availability information may indicate that the test robot 220 is available based on a current load on the test robot 220.

In some implementations, the availability information may indicate that a first test robot 220 is unavailable to execute the test steps. For example, the availability information may indicate that the test equipment is unavailable when the test equipment is actively executing a test step or scheduled to execute a test step. As another example, the availability information may indicate that the test equipment is unavailable when the test step being scheduled may not be performed synchronously with test steps previously scheduled for the test equipment. As another example, the availability information may indicate that the test equipment is unavailable when the test equipment is powered off. As another example, the availability information may indicate that the test robot 220 is unavailable based on a current load on the test robot 220.

In some implementations, the availability information may indicate a quantity of resources of the test equipment. For example, the availability information may indicate a quantity of the available and/or unavailable resources of test robot 220, card reader device 240, or the like. Additionally, or alternatively, the availability information may indicate a type of the resources of the test equipment. For example, the availability information may indicate that a card reader, a stepper motor, a web browser, a turnstile controller, a robotic arm, or the like, of test robot 220 and/or card reader device 240 are available and/or unavailable for executing the test steps. Additionally, or alternatively, the availability information may indicate a status of the resources of the test equipment. For example, the availability information may indicate that a robotic arm associated with test robot 220 is available to execute the test steps.

In some implementations, test management device 210 may receive the availability information in response to transmitting a request (e.g., via a broadcast, a multicast, a unicast, etc.) for a type of test robot 220. For example, test management device 210 may receive a response from a bus test robot that indicates the availability of the bus test robot in response to transmitting a request for a bus test robot. Additionally, or alternatively, test management device 210 may receive a response to a request for test robots 220 that includes information associated with scheduling a test step (e.g., a start time, a duration, etc.). For example, test management device 210 may receive a response that indicates whether test robots 220 are available to execute the test step at a particular time, based on the scheduling information.

In some implementations, when test management device 210 does not receive a response from test robot 220 or does not receive a response within a particular amount of time (e.g., a threshold amount of time), test management device 210 may determine that test robot 220 is unavailable. Additionally, or alternatively, test management device 210 may re-transmit the request (e.g., once or multiple times) when test management device 210 does not receive the response or does not receive the response within a particular amount of time. When test management device 210 re-transmits the request, test management device 210 may make a determination of the availability of test robot 220 as a result of receiving or failing to receive a response from test robot 220.

As further shown in FIG. 4, process 400 may include generating a scenario dependency graph associated with the test scenario and generating a suite dependency graph associated with the test suite using the scenario dependency graph (block 440). For example, test management device 210 may determine an order of the test steps associated with the test scenario.

In some implementations, test management device 210 may determine a sequence of the test steps when determining the order of the test steps. For example, test management device 210 may determine that the sequence of the test steps indicates that a first test step of the test scenario is to be executed prior to a second test step of the test scenario, which is to be executed prior to a third test step of the test scenario, etc.

Additionally, or alternatively, test management device 210 may determine the dependency of the test steps when determining the order of the test steps. For example, test management device 210 may determine whether a particular test step receives output from and/or provides input to a different test step, whether the tester has indicated that a particular test step depends from another test step, or the like. Additionally, or alternatively, test management device 210 may determine whether a particular test step may be executed synchronously with one or more different test steps when determining the order of the test steps. For example, test management device 210 may determine that a first test step and a second test step may be executed in parallel.

In some implementations, test management device 210 may generate a scenario dependency graph (e.g., a directed graph, a directed acyclic graph, an undirected graph, etc.), that indicates the order of the test steps, the dependency of the test steps, and/or whether the test equipment may execute any of the test steps with any other test steps. In some implementations, test management device 210 may store the scenario dependency graph.

In some implementations, test management device 210 may determine the order of the test steps of multiple test scenarios associated with the test suite. For example, a test suite may include a first test scenario, a second test scenario, a third test scenario, etc. In this case, test management device 210 may determine the order of the test steps associated with the first test scenario, an order of the test steps associated with the second test scenario, an order of the test steps associated with the third test scenario, etc.

In some implementations, test management device 210 may generate a suite dependency graph that indicates the order and/or the dependency of the test steps associated with the test scenarios included in the test suite and/or whether the test equipment may execute any of the test steps synchronously with any other test steps. In some implementations, test management device 210 may use the scenario dependency graphs to generate the suite dependency graph. Test management device 210 may store the suite dependency graph.

In this way, synchronous execution of test steps may be determined via generation of a scenario dependency graph and/or a suite dependency graph, which may increase an efficiency of the test equipment when executing the test steps by reducing execution time of the test steps.

As further shown in FIG. 4, process 400 may include generating an execution graph for the test suite using the suite dependency graph and the availability information (block 450). For example, test management device 210 may generate information associated with scheduling, assigning, and/or executing the test steps. In some implementations, test management device 210 may schedule the test steps for execution by determining a manner of execution of the test steps, such as by identifying the test equipment that is to execute the test steps, determining a resource of the test equipment that is to execute that the test steps, determining an order for executing the test steps, determining an execution time of the test steps, determining whether to include additional test steps (e.g., power on, power off, configuration test steps, etc.) in the test suite, or the like.

In some implementations, the availability of the test equipment may prevent the test equipment from executing the test steps synchronously and/or in the order indicated by the suite dependency graph. For example, assume that a first test step and a second test step lack dependency (e.g., may execute synchronously) and that the first test step and the second test step are to execute on a robotic arm associated with test robot 220. Further assume, for example, that test robot 220 includes a single robotic arm. In this case, when generating the execution graph, test management device 210 may schedule the first test step to execute on the robotic arm before the second test step executes on the robotic arm, despite the lack of dependency, because test robot 220 includes a single robotic arm and may not execute the first test step and the second test step synchronously.

In some implementations, test management device 210 may determine that the availability of the test equipment may permit synchronous execution of the test steps and/or execution of the test steps in the order indicated by the suite dependency graph. For example, test management device 210 may determine that a first test robot 220 and a second test robot 220 are available to execute a first test step and a second test step synchronously. As another example, test management device 210 may determine that two or more different resources of a first test robot 220 are available to execute a first test step and a second test step synchronously. As another example, test management device 210 may determine that two or more of the same resource of test robot 220 are available to execute two test steps synchronously.

In some implementations, test management device 210 may generate the execution graph using tester parameter information. For example, test management device 210 may generate the execution graph in a manner that reduces or minimizes power consumption during execution of the test steps, such as when the tester parameter information indicates to reduce or minimize power consumption during the execution of the test steps. As another example, test management device 210 may generate the execution graph in a manner that reduces or minimizes an execution time (e.g., time periods, cycles, etc.) for executing the test steps, such as when the tester parameter information indicates to reduce or minimize execution time for the test steps.

As another example, test management device 210 may determine a quantity of test equipment to use when executing the test steps, such as when the tester parameter information indicates to reduce or minimize the quantity of test equipment used to execute the test steps. As another example, test management device 210 may determine that the tester parameter information indicates to modify the type of test robot 220 from a first type, such as a bus test robot, to a second type, such as a subway test robot (e.g., by sending configuration information to re-configure test robot 220).

In some implementations, test management device 210 may insert additional test steps not initially included in the test suite when generating the execution graph. For example, test management device 210 may include power on test steps to power on the test equipment prior to executing the first test step, such as via wake-up or power on signals. As another example, test management device 210 may include power off test steps to power off the test equipment after executing the final test step, such as via sleep or power down signals. As another example, test management device 210 may include power on and/or power off test steps to power on and/or power off the test equipment and/or the resources during the execution of the test steps, such prior to use and/or when idle.

Additionally, or alternatively, test management device 210 may insert configuration test steps not initially included in the test suite. For example, test management device 210 may include a test step to configure fare card 230 prior to test robot 220 tapping fare card 230 to card reader device 240.

In some implementations, test management device 210 may group synchronous test steps for execution by a single test robot 220 when generating the execution graph. For example, assume that test robot 220 determines that the test equipment may execute a first test step using a robotic arm and a second test step using a web browser, and that these test steps do not depend on one another. In this case, test management device 210 may schedule the first test step and the second test step for synchronous execution on a first test robot 220. In some implementations, test management device 210 may store the execution graph.

In this way, computing, processor, and/or power resources may be conserved by generating an execution graph, which may prevent execution of test steps on test equipment, and by including power off test steps, which may reduce power consumption by idle test equipment and/or resources. Additionally, synchronous execution of test steps may be determined, which may increase an efficiency of the test equipment when executing the test steps by reducing execution time of the test steps.

As further shown in FIG. 4, process 400 may include assigning the test suite to the test equipment using the execution graph, and initiating execution of the test suite (block 460). For example, test management device 210 may assign the test steps to the test equipment for execution using the execution graph. In some implementations, test management device 210 may assign the test steps to one or more test robots 220, one or more card reader devices 240, or the like.

In some implementations, test management device 210 may assign the test steps to the resources of test robot 220. For example, test management device 210 may assign a test step associated with tapping fare card 230 to card reader device 240 to a robotic arm associated with test robot 220. In some implementations, test management device 210 may initiate the execution of the test steps associated with the test suite (e.g., by providing instructions to test robot 220 to execute the test steps).

As further shown in FIG. 4, process 400 may include determining whether updated information is received (block 470). For example, test management device 210 may detect updated availability information and/or updated tester parameter information. In some implementations, test management device 210 may detect that one or more test equipment have become available (e.g., powered on, active, connected, configured, etc.) or unavailable (e.g., powered off, inactive, disconnected, failed, reconfigured, etc.).

Additionally, or alternatively, test management device 210 may receive information associated with updated tester parameter information. For example, test management device 210 may receive information indicating that the tester has changed the execution time from a first time period to a second time period. As another example, test management device 210 may receive information indicating that the tester has changed the quantity of test equipment to be used to execute the test steps from a first quantity to a second quantity. As another example, test management device 210 may receive information indicating that the tester has changed the tester parameters (e.g., from reducing execution time to reducing power consumption, etc.).

As further shown in FIG. 4, if updated information is received (block 470—YES), then process 400 may include returning to block 450. For example, test management device 210 may generate an execution graph using the updated availability information and/or the updated tester parameter information. In some implementations, test management device 210 may generate the execution graph prior to the test equipment concluding the execution of the test steps. Additionally, or alternatively, when test management device 210 generates the execution graph prior to the test equipment concluding the execution of the test steps, test management device 210 may reassign the remaining unexecuted test steps and may not reassign or re-execute the executed test steps.

In this way, computing and/or processor resources of test equipment may be conserved by reassigning test steps when a test management device receives updated availability information and/or tester parameter information, which may prevent the test equipment from executing previously assigned steps. Additionally, power resources of the test equipment may be conserved by providing the test equipment with instructions indicating when to power off, such as when the test equipment is idle.

As further shown in FIG. 4, if updated information is not received (block 470—NO), then process 400 may include receiving a result of the execution of the test suite (block 480). For example, test management device 210 may receive an output from the test equipment at the conclusion of the execution of the test steps. In some implementations, test management device 210 may provide the output for display to the tester.

In some implementations, the result may include information associated with the execution of the test steps, such as information indicating a success and/or a failure of the test steps, monitored feedback information (e.g., test observations), data recorded during the execution of the test steps, reports, or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein enable synchronous execution of test steps, which may increase an efficiency of the execution of the test steps by reducing execution time. In addition, implementations described herein may enable use of availability information and/or tester parameter information, which may increase the efficiency of the execution of the test steps by preventing available test equipment from being unused and by enabling reduction of execution time, reduction of power consumption, or the like. Further, implementations described herein enable inclusion of power off test steps in an execution graph, which may conserve power resources, computing resources, and/or processor resources by reducing an amount of time that test equipment is powered on when the test equipment is idle and by preventing the test equipment from executing the test steps.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, comprising:
 a memory; and
 one or more processors to:
  receive information that identifies a plurality of test steps to be performed by a plurality of test equipment;
  determine one or more dependencies associated with the plurality of test steps;
  receive availability information associated with an availability of the plurality of test equipment for performing the plurality of test steps,
   the availability information including an indication of a type of at least one test equipment of the plurality of test equipment;

generate, based on the availability information and the one or more dependencies, an execution graph to reduce an execution time of the plurality of test steps, the execution graph indicating an order of execution, by the plurality of test equipment, of the plurality of test steps, the plurality of test steps comprising a first test step and a second test step, and the availability information indicating that a particular test equipment, of the plurality of test equipment, is available to execute the first test step and the second test step synchronously;

assign one or more test steps, of the plurality of test steps, to one or more test equipment, of the plurality of test equipment, based on the execution graph;

initiate execution of the one or more test steps based on assigning the one or more test steps to the one or more test equipment;

receive, based on initiating the execution of the one or more test steps, updated availability information;

re-assign, based on receiving the updated availability information, one or more remaining unexecuted test steps to the plurality of test equipment prior to the one or more test equipment concluding the execution of the one or more test steps; and initiate, based on re-assigning the one or more remaining unexecuted test steps to the plurality of test equipment, execution of the one or more remaining unexecuted test steps to conserve computing or processing resources of the one or more test equipment.

2. The device of claim 1, where the one or more processors are further to:

update the execution graph using the updated availability information based on receiving the updated availability information; and where the one or more processors, when re-assigning the one or more remaining unexecuted test steps to the plurality of test equipment, are to:

re-assign the one or more remaining unexecuted test steps to the plurality of test equipment based on updating the execution graph.

3. The device of claim 1, where the one or more processors, when generating the execution graph, are to:

include, in the execution graph, a test step associated with:

powering on one or more of the plurality of test equipment, powering off one or more of the plurality of test equipment, or configuring one or more of the plurality of test equipment.

4. The device of claim 1, where the availability information includes:

a quantity or a status of the plurality of test equipment, or a quantity, a type, or a status of resources of the plurality of test equipment.

5. The device of claim 1, where the particular test equipment is a first test equipment;

where the plurality of test steps comprise a third test step and a fourth test step; and where the order of execution indicates that the third test step is scheduled to be executed on a second test equipment before the fourth test step based on:

the fourth test step lacking the one or more dependencies from the third test step, and the availability information indicating that the second test equipment is prevented from executing the third test step and the fourth test step synchronously.

6. The device of claim 1, where the one or more processors are further to:

receive information input by a user; and where the one or more processors, when generating the execution graph, are to:

generate the execution graph based on the information input by the user.

7. The device of claim 6, where the information input by the user includes at least one of:

a preference relating to an amount of time associated with executing the plurality of test steps, a preference relating to an amount of power consumed by the plurality of test equipment during execution of the plurality of test steps, or a preference relating to a quantity of the plurality of test equipment to be used when executing the plurality of test steps.

8. A non-transitory computer-readable medium storing instructions, the instructions comprising:

one or more instructions that, when executed by one or more processors, cause the one or more processors to:

receive a test suite associated with a test, the test suite including a plurality of test steps associated with one or more test scenarios;

receive availability information indicating an availability of test equipment to be used during the test, the availability information further indicating a type of the test equipment;

determine at least one dependency associated with the plurality of test steps;

generate, based on the availability information and the at least one dependency, scheduling information, associated with scheduling the test suite for execution by the test equipment, to reduce an execution time of the plurality of test steps, the plurality of test steps comprising a first test step and a second test step, and the availability information further indicating that a particular test equipment is available to execute the first test step and the second test step synchronously;

schedule the test suite for execution based on the scheduling information;

initiate execution of the test suite based on scheduling the test suite for execution;

receive, based on initiating the execution of the test suite, updated availability information;

re-generate, based on the updated availability information, the scheduling information to include one or more remaining unexecuted test steps for execution by the test equipment prior to the test equipment concluding the execution of the test suite; and initiate, based on re-generating the scheduling information, execution of the one or more remaining unexecuted test steps to conserve computing or processing resources of the test equipment.

9. The non-transitory computer-readable medium of claim 8, where the updated availability information includes information associated with the type of the test equipment.

10. The non-transitory computer-readable medium of claim 8, where the one or more instructions, that cause the one or more processors to generate the scheduling information, cause the one or more processors to:

receive information associated with one or more tester parameters input by a user; and generate, based on the information, the scheduling information.

11. The non-transitory computer-readable medium of claim 8, where the one or more instructions, when executed by the one or more processors, further cause the one or more processors to:

receive results associated with the execution of the test suite.

12. The non-transitory computer-readable medium of claim 8, where the one or more instructions, that cause the one or more processors to generate the scheduling information, cause the one or more processors to:

include, in the scheduling information, information associated with powering on or powering off the test equipment.

13. The non-transitory computer-readable medium of claim 8, where the one or more instructions, that cause the one or more processors to generate the scheduling information, cause the one or more processors to:

generate first scheduling information when a tester parameter indicates to conserve execution time, or generate second scheduling information when the tester parameter indicates to conserve test equipment resources, the second scheduling information being different from the first scheduling information.

14. The non-transitory computer-readable medium of claim 8, where the particular test equipment is a first test equipment;

where the plurality of test steps comprise a third test step and a fourth test step; and where the scheduling information indicates that the third test step is scheduled to be executed on a second test equipment before the fourth test step based on:

the fourth test step lacking the at least one dependency from the third test step, and the availability information indicating that the second test equipment is prevented from executing the third test step and the fourth test step synchronously.

15. A method, comprising:

receiving, by a device, at least one test scenario including actions to be performed by test equipment, the at least one test scenario being associated with a test suite;

receiving, by the device, availability information indicating a quantity, a type, or a status of the test equipment or a resource of the test equipment for performing the actions;

determining, by the device, an order in which the actions are to be performed;

generating, by the device and based on the order and the availability information, scheduling information for the actions to reduce an execution time of the actions, the actions comprising a first action and a second action, and the availability information further indicating that a particular test equipment is available to execute the first action and the second action synchronously;

scheduling, by the device and based on the scheduling information, the actions for execution by the test equipment;

initiating, by the device and based on scheduling the actions, execution of the actions;

receiving, by the device and based on initiating the execution of the actions, updated availability information;

re-generating, by the device and based on the updated availability information, the scheduling information to include one or more remaining unexecuted actions for execution by the test equipment; and initiating, by the device and based on re-generating the scheduling information, execution of the one or more remaining unexecuted actions to conserve computing or processing resources of the test equipment.

16. The method of claim 15, where generating the scheduling information further comprises:

determining that a third action is to be performed by a first test equipment, the third action being associated with a first type of test equipment;

determining that a fourth action is to be performed by a second test equipment, the fourth action being associated with a second type of test equipment; and determining that the fourth action depends from the third action.

17. The method of claim 15, where the test equipment includes a test robot, a fare card, or a card reader device.

18. The method of claim 15, further comprising:

receiving information indicating a modification of tester parameters; and where generating the scheduling information further comprises:

generating the scheduling information based on the information.

19. The method of claim 15, further comprising:

receiving a result associated with the execution of the actions;

generating a report that includes the result; and outputting the report for display.

20. The method of claim 15, where the particular test equipment is a first test equipment;

where the actions comprise a third action and a fourth action; and where the scheduling information indicates that the third action is scheduled to be executed on a second test equipment before the fourth action based on:

the fourth action lacking one or more dependencies from the third action, and the availability information indicating that the second test equipment is prevented from executing the third action and the fourth action synchronously.

* * * * *